United States Patent [19]
Beelitz

[11] Patent Number: 6,032,239
[45] Date of Patent: Feb. 29, 2000

[54] SYSTEM AND METHOD FOR UPDATING PARTITION MAPPINGS TO LOGICAL DRIVES IN A COMPUTER MEMORY DEVICE

[75] Inventor: Alan E. Beelitz, Austin, Tex.

[73] Assignee: Dell USA, L.P., Round Rock, Tex.

[21] Appl. No.: 08/950,545

[22] Filed: Oct. 15, 1997

[51] Int. Cl.[7] .................................................. G06F 12/00
[52] U.S. Cl. .......................................... 711/173; 713/100
[58] Field of Search .................................... 711/170–173; 713/1, 100

[56] References Cited

U.S. PATENT DOCUMENTS 5,675,769  10/1997  Ruff et al. .
5,974,517  10/1999  Gaudet ..................................... 711/173

FOREIGN PATENT DOCUMENTS 0 794 484 A2  9/1997  European Pat. Off. .

OTHER PUBLICATIONS

U.S. Patent Application No. 08/947,138, filed on Oct. 8, 1997, Beelitz, *Method for Simulating a Computer Storage Device*, Abstract & 1 sheet of drawings.

U.S. Patent Application No. 08/984,386, filed on Dec. 3, 1997, Beelitz, *System and Method for Changing Partition Mappings to Logical Drives in a Computer Memory*, Abstract & 2 sheets of drawings.

Windows Sources, vol. 5, No. 2, Feb. 1997, J. Moran, "Partition Magic FA Ttens up". p. 58 and also IAC Accession No. 19032532.

Microsoft System Journal, vol. 8, No. 9, Sep. 1993, J. Prosise, "MS–DOS questions and answers", pp. 85–87, and also IAC Accession No. 14145778.

Windows Sources, vol. 1, No. 5, Jun. 1993, J. McGarvey, "New Uses for RAM Disks", pp. 398–399, and also IAC Accession No. 13736768.

PC Magazine vol. 11, No. 2, Jan. 28, 1992, J. Prosise, "Tutor", pp. 287–288, and also IAC Accession No. 1712686.

*Primary Examiner*—Eddie P. Chan
*Assistant Examiner*—Kevin Verbrugge
*Attorney, Agent, or Firm*—Haynes & Boone, L.P.

[57] ABSTRACT

A system and method for changing partition mappings to logical drives in a memory device of a computer. The computer includes a processor for running operating system code and a hard drive. The hard drive, which can be accessed by the processor, includes at least one partition. When the computer boots up, a logical reference value in the operating system code points to the partition. After the partition has been initialized or modified, a reference-updating routine is run for dynamically updating the logical reference value to correctly map to the partition. The reference-updating routine first locates and flushes any caches in the computer and closes any open files accessible by the operating system code. The routine then loads a boot record for the partition and retrieves specific data therefrom. With the retrieved data, the routine updates the logical reference value. Therefore, after the reference-updating routine has performed the updating, the processor may continue running the operating code without requiring the computer to reboot.

13 Claims, 1 Drawing Sheet

SYSTEM AND METHOD FOR UPDATING PARTITION MAPPINGS TO LOGICAL DRIVES IN A COMPUTER MEMORY DEVICE

BACKGROUND

The present disclosure relates generally to computers and software code for controlling access to a computer memory device, and, more specifically, to a system and method for dynamically changing the mapping of partitions of the disk to a logical drive of the operating system code.

The main storage area for most computers is typically distributed between one or more storage devices, such as a hard disk. Furthermore, each storage is often separated into one or more partitions so that certain data or programs can be separately stored. For example, in a computer that utilizes DOS and/or WINDOWS 95 operating systems, as provided by Microsoft Corporation of Redmond, Wash., a single computer hard drive may be partitioned into a "primary" partitions, and one "extended" partition, such as is described in Table 1, below. Continuing the example of Table 1, the operating system references the primary partition as a "logical" C: drive and the extended partition is further subdivided into two logical drives, each of which will have a separate drive letter D: and E:. In general, only one primary partition can be "active" (e.g., visible to the operating system) at a time.

TABLE 1

| Partition | Logical Drive |
|---|---|
| First Primary | C: |
| First Extended | D: |
| Second Extended | E: |

There are several common situations in which partitions are created, or defined. One such situation is when a user is adding and preparing a new hard drive to a computer. When preparing the new hard drive, the user will initialize the hard drive into one or more partitions. Another situation is when a user wants to re-partition his existing hard drive using a utility program such as PARTITION MAGIC from Power-Quest Corporation of Orem, Utah. Once the hard drive has been partitioned or re-partitioned, the computer must then be rebooted so that the operating system has an updated version of the partition(s) in its reference tables. However, such reboots take a large amount of time and resources. This is especially problematic when the user is a manufacturer of new computers, who must perform a reboot on every new computer. Furthermore, reboots lose or reconfigure certain aspects of the computer that the user may want to retain.

SUMMARY

In response thereto, provided is a system and method for changing partition mappings to logical drives in a memory device of a computer without requiring the computer to reboot. In one embodiment, the computer includes a processor for running operating system code and a hard drive memory device. The hard drive, which can be accessed by the processor, includes at least one partition. When the computer boots up, a logical reference value in the operating system code points to the partition. After the partition has been initialized or modified, a reference-updating routine is run for dynamically updating the logical reference value to correctly map to the partition.

The reference-updating routine first locates and flushes any caches in the computer and closes any open files accessible by the operating system code. The routine then loads a boot record for the partition and retrieves specific data therefrom. With the retrieved data, the routine updates the logical reference value. Therefore, after the reference-updating routine has performed the updating, the processor may continue running the operating code without requiring the computer to reboot.

A technical advantage achieved is that the hard drive can be partitioned or re-partitioned and then immediately accessed without requiring reboots in between and thereby saving a substantial amount of time.

Another technical advantage achieved is that the configuration of the computer can be maintained, even though the hard drive has been partitioned or re-partitioned.

DETAILED DESCRIPTION OF THE PREFERRED EMBODIMENT

The following disclosure incorporates by reference U.S. patent application Ser. No. 08/984,386, entitled "Method for Changing Partition Mappings to Logical Drives in a Computer Memory Device" and U.S. patent application Ser. No. 08/947,138, entitled "Method for Simulating a Computer Storage Device", filed concurrently herewith.

Figure 1:
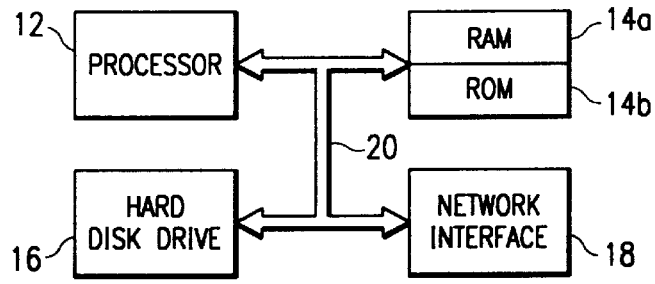
FIG. 1 is a block diagram of a computer for implementing one embodiment.

Referring to FIG. 1, the reference numeral 10 designates a computer having several components, including a processor 12, a bank of random access memories (RAM) 14a and read only memories (ROM) 14b, a hard disk 16, and a network interface 18. Each component is capable of communication with the processor 12, as graphically represented by a general bus 20. In the present example, the computer 10 is a personal computer running Microsoft DOS operating system code. It is understood, however, that the computer 10 and its illustrated components are merely representative of many different types of computers and components well known and understood by those of ordinary skill in the art.

Figure 2:
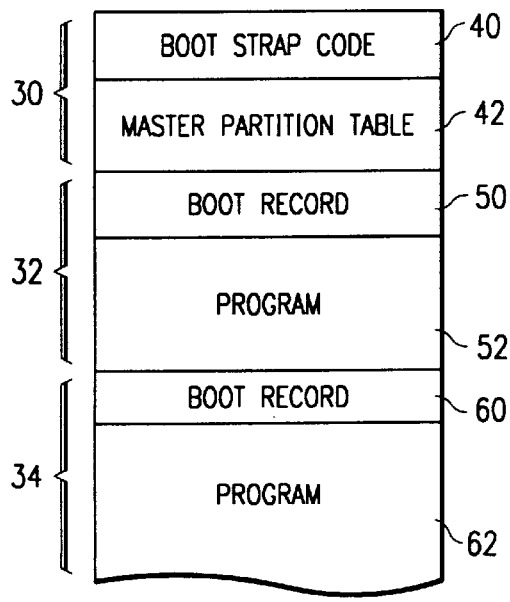
FIG. 2 is a layout diagram of a hard drive of the computer of FIG. 1.

Referring to FIG. 2, the hard disk 16 is subdivided into three different partitions: a master boot record 30, a first partition 32, and a second partition 34. Located in the master boot record 30 is boot strap code 40 and a master partition table 42. The master partition table includes codes that represent data specific to each partition 32 and 34, as discussed in greater detail, below. It is understood that the additional software in the master boot record 30, including the boot strap code 40, is well known in the art and, for the sake of brevity, will not be further discussed.

The first partition 32 includes a boot record 50 and one or more pieces of software, such as a program 52. Likewise, the second partition 34 also contains a boot record 60 and one or more pieces of software, such as a program 62. In the present example, both partitions 32, 34 are primary partitions, each having the same logical drive reference. Furthermore, both partitions 32, 34 have been recently modified as to their length and/or location. Conventionally, such modification requires that the computer 10 be rebooted so that DOS can correctly reference the modified partitions 32, 34. However, the computer 10 does not need to be rebooted when the below-described routine is implemented.

Figure 3:
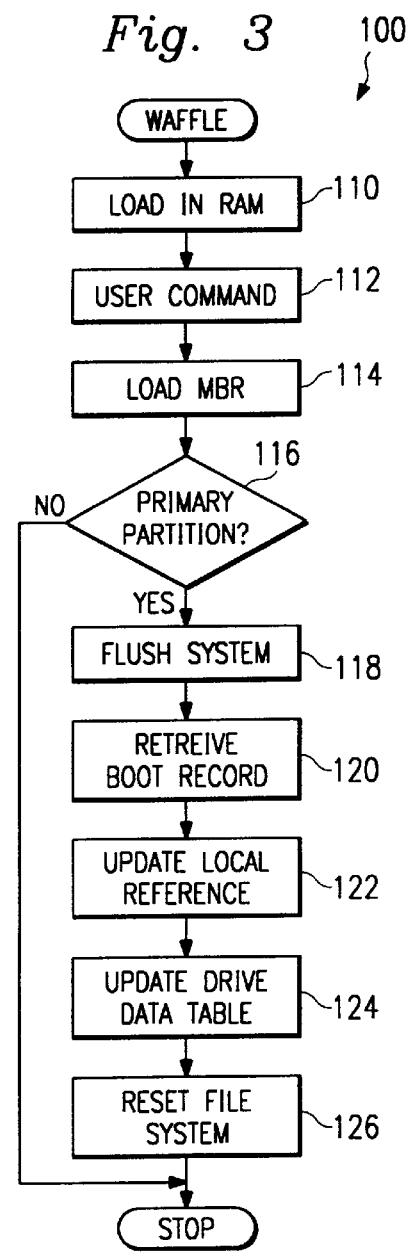
FIG. 3 is a flow chart of a routine to be run by the computer of FIG. 1.

Referring to FIG. 3, a routine 100 entitled "Waffle" allows DOS to reference and/or update the modified partitions dynamically, i.e., without requiring a reboot of the computer 10. Prior to Waffle 100 being run, the hard disk 16 is initialized or reconfigured, the utility partition 32 is marked inactive, and the primary partition 34 is marked active.

At step 110, Waffle 100 is loaded into RAM 14a and run. Waffle is a logical-reference-updating routine and, in the present embodiment, is downloaded from a network connected through the network interface 18. In addition, the network includes some operating system code so that the computer 10 may at this step reboot from the network, i.e., the computer reboots using the operating system code retrieved from the network interface 18. Such configuration is particularly applicable when the network contains disk formatting software for initializing new hard disks or partition changing software for adding, deleting or changing partitions on an existing hard disk. Alternatively, Waffle 100 may be loaded from either or both of the partitions 32 and 34, from a floppy disk (not shown) or other source.

At step 112, a command is received from a user. A command "refresh" indicates to Waffle that the user wants to access the utility partition 32, while a command "primary" indicates to Waffle that the partitions 32, 34 have been modified and the user wants to access and/or use the modified partitions. The commands may be input from a user interface (not shown) or input device. Furthermore, it is anticipated that additional partitions may also be available, but only two partitions will be herein discussed for the sake of simplicity.

At step 114, the master boot record 30 is loaded from the hard disk 16. At step 116, a determination is made as to whether at least one of either the first partition 32 or the second partition 34 is a primary partition. If not, execution is stopped. If so, execution proceeds to step 118 where the memory system is flushed. This step may perform several operations. For one, if the computer 10 includes one or more caches, including disk caches, the caches are flushed. Also, all open files in use by DOS or any other open application running on the computer are closed.

At step 120, the boot record for the primary partition is retrieved. In the present example, boot record 60 is retrieved. At step 122, DOS's logical reference for the primary partition is updated. This is accomplished by using a BIOS Parameter Block ("BPB") from the primary boot record 60 to update a Drive Parameter Block ("DPB") in DOS. At step 124, the BPB from the primary boot record 60 is also used to update a Drive Data Table ("DDT") for the logical drive reference. At step 126, the internal file system used by DOS is reset, according to the changes in the partitions 32, 34. This step includes flushing any internal buffers of the hard disk 16.

Although illustrative embodiments have been shown and described, a latitude of modification, change and substitution is intended in the foregoing disclosure, and in certain instances, some features of the invention will be employed without a corresponding use of other features. Furthermore, additional features, such as error handling routines, may be added to the illustrative embodiment without altering the scope of the invention. Accordingly, it is appropriate that the appended claims be construed broadly and in a manner consistent with the scope of the invention.

What is claimed is:

1. A computer comprising:

at least one processor for running software including operating code;

at least one storage device accessible by the processor, the storage device having at least one partition;

the operating code including a partition table for mapping a logical reference value to a first partition of the at least one partition; and a routine for dynamically modifying the logical reference value to the first partition by altering the partition table, wherein altering the partition table includes updating a partition mapping to a logical drive using a BIOS Parameter Block data retrieved from a boot record of the first partition, wherein further the operating system logical reference value is modified for the first partition by using the BIOS Parameter Block data of the first partition to update an operating system Drive Parameter Block and by using the BIOS Parameter Block data to update a Drive Data Table;

wherein after the routine alters the partition table, the processor may continue running the operating code without requiring the computer to reboot and when the operating code uses the logical reference to the storage device, the operating code correctly maps to the first partition.

2. The computer of claim 1 further comprising a memory system and wherein the routine also flushes the memory system after modifying the logical reference.

3. The computer of claim 2 wherein the memory system further comprises a disk cache and one or more open files and wherein the routine flushes the memory system by flushing the disk cache and closing the one or more open files.

4. The computer of claim 1 wherein the operating code includes a file management system and wherein the routine also resets the file management system after modifying the logical reference.

5. The computer of claim 1 further comprising a second storage device and wherein the routine is stored on the second storage device.

6. The computer of claim 5 wherein the second storage device is a floppy diskette.

7. The computer of claim 5 wherein the second storage device is connected to the processor through a network.

8. The computer of claim 5 wherein the operating code is stored on the second storage device.

9. The computer of claim 1 wherein the routine updates the logical reference in response to a user command.

10. A method for allowing a computer operating system to dynamically reference a recently modified partition of a storage device, the method comprising the steps of:

locating and flushing any caches for the modified partition accessible by the computer operating system;

locating and closing any open files accessible by the computer operating system;

loading a boot record for the modified partition and retrieving a BIOS Parameter Block therefrom; and modifying a logical reference value used by the computer operating system with information retrieved from the BIOS Parameter Block, accordingly updating a partition mapping to a logical drive using BIOS Parameter Block data retrieved from the boot record of the modified partition, wherein the operating system logical reference value is modified for the modified partition by using the BIOS Parameter Block data of the modified partition to update an operating system Drive Parameter Block and by using the BIOS Parameter Block data to update a Drive Data Table.

11. The method of claim 10 further comprising:

loading a master boot record from the storage device; and determining that the modified partition is a primary partition.

12. A system for allowing a computer operating system to dynamically reference a modified partition of a storage device, the system comprising:

means for locating and flushing any caches for the modified partition accessible by the computer operating system;

means for locating and closing any open files accessible by the computer operating system;

means for loading a boot record for the modified partition and retrieving a BIOS Parameter Block therefrom; and means for modifying a logical reference value used by the computer operating system with information retrieved from the BIOS Parameter Block, accordingly for updating a partition mapping to a logical drive using BIOS Parameter Block data retrieved from the boot record of the modified partition, wherein the operating system logical reference value is modified for the modified partition by using the BIOS Parameter Block data of the modified partition to update an operating system Drive Parameter Block and by using the BIOS Parameter Block data to update a Drive Data Table.

13. The system of claim 12 further comprising:

means for loading a master boot record from the storage device; and means for determining that the modified partition is a primary partition.

* * * * *